Figure 1:
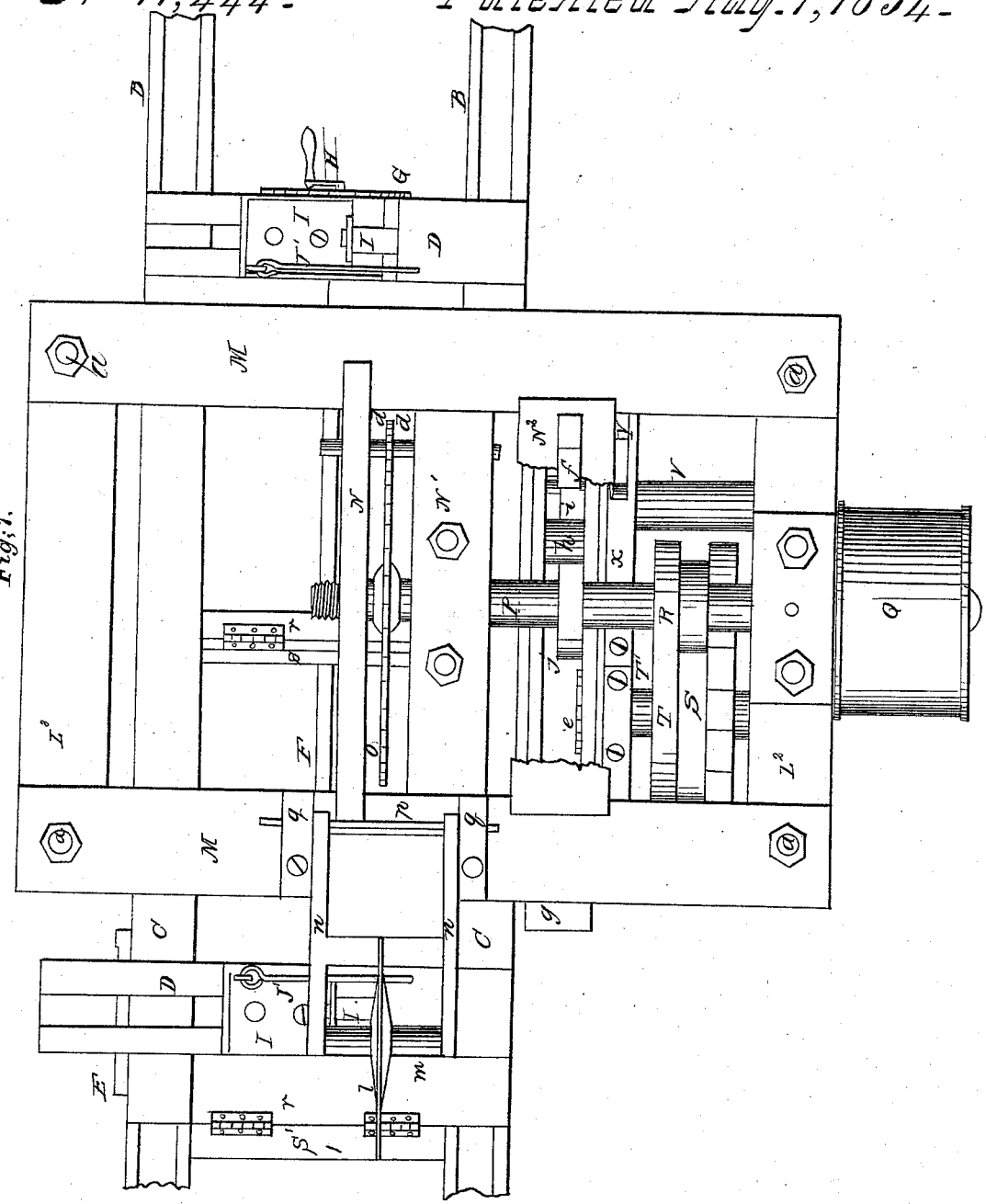

I. Stull,
Circular Saw Mill.
Nº 11,444. Patented Aug. 1, 1854.

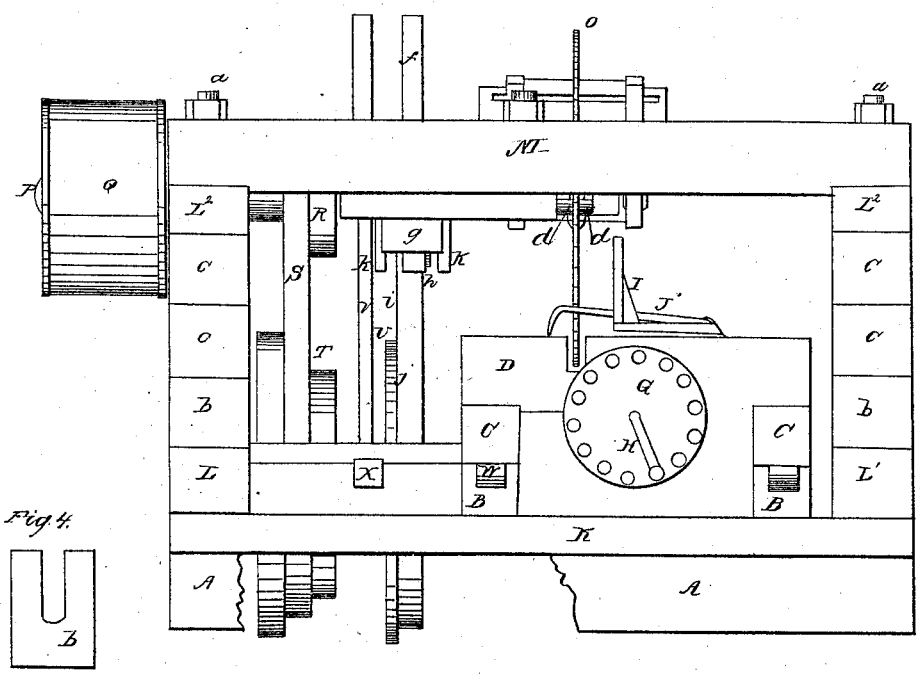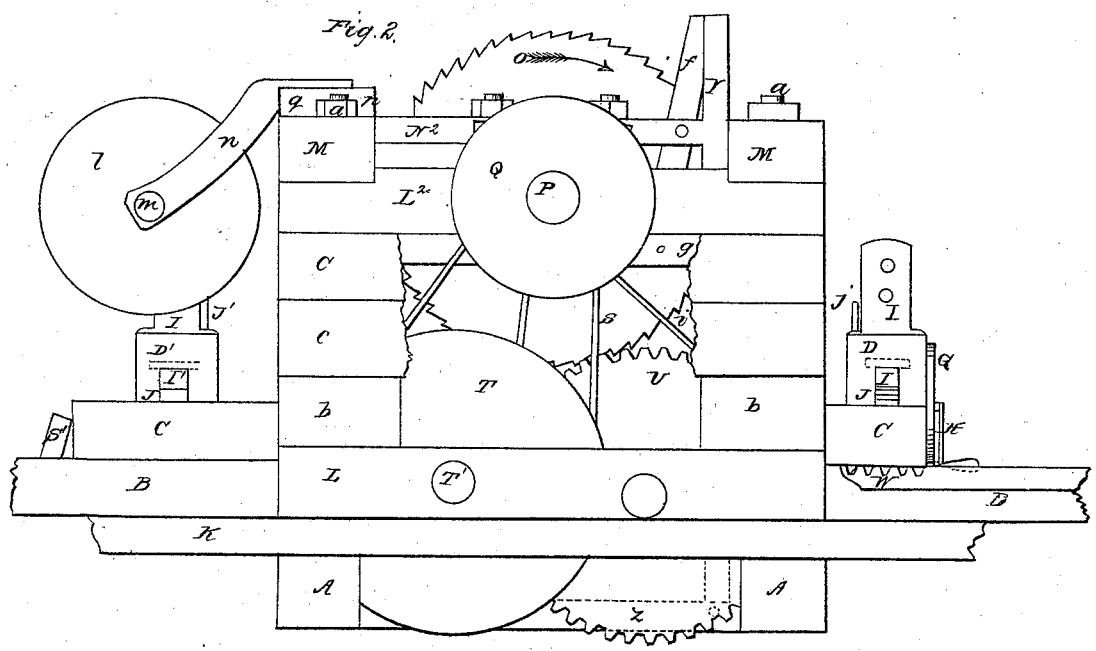

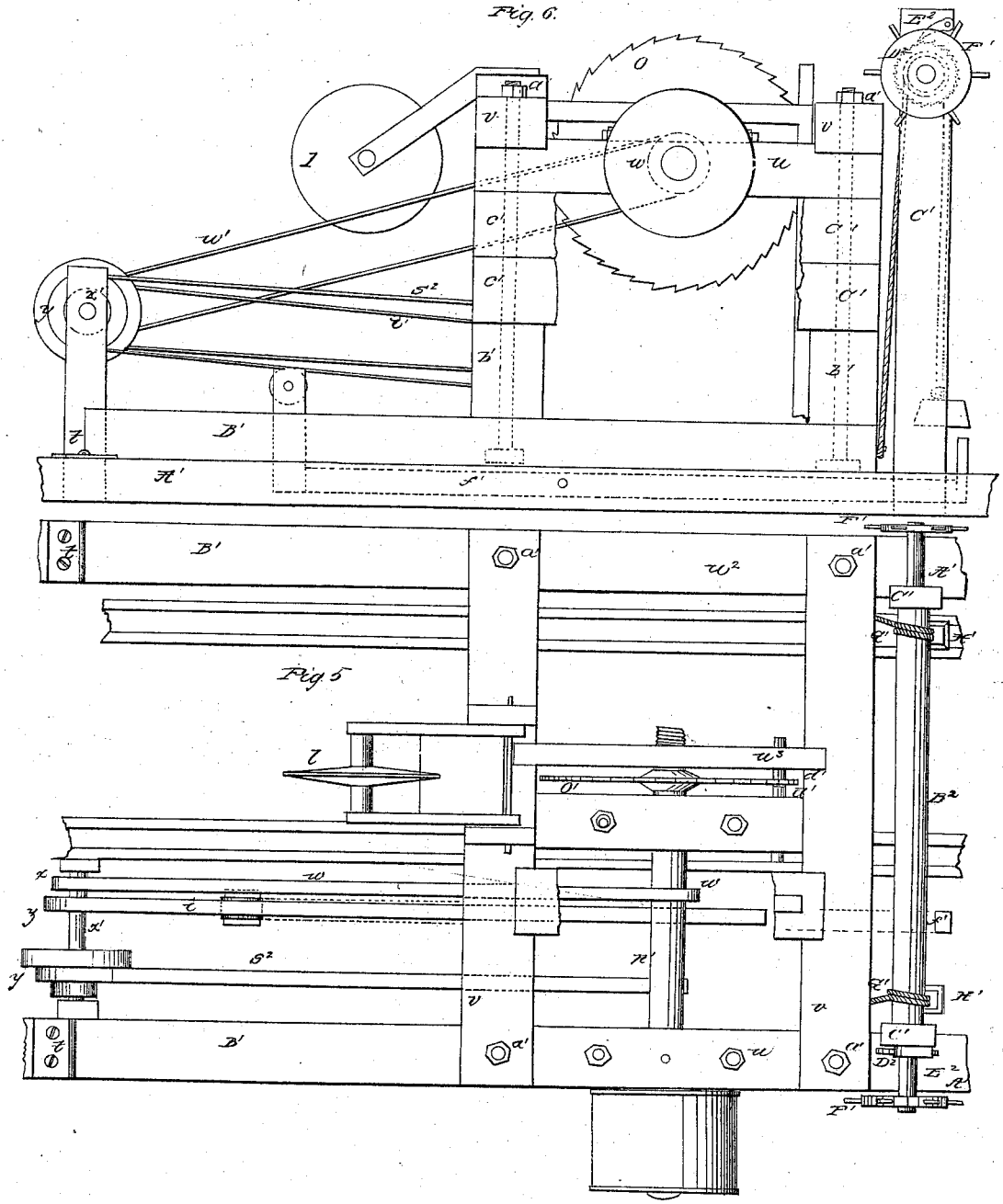

UNITED STATES PATENT OFFICE.

JOHN STULL, OF PHILADELPHIA, PENNSYLVANIA.

SAWMILL.

Specification of Letters Patent No. 11,444, dated August 1, 1854.

*To all whom it may concern:*

Be it known that I, JOHN STULL, of Philadelphia, in the county of Philadelphia and State of Pennsylvania, have invented certain new and useful Improvements in Sawmills; and I do hereby declare that the same are described and represented in the following specifications and drawings.

To enable others skilled in the art to make and use my improvements I will proceed to describe their construction and use referring to the drawings in which the same letters indicate like parts in each of the figures.

Figure 1, is a plan or top view. Fig. 2, is an elevation of one side. Fig. 3, is an elevation of one end.

In the above mentioned drawings A A are sills to which the ways B B are fastened which ways are grooved to receive the ribs on the under side of the carriage rails C C, which rails are connected by the head block D which is fastened to them and the tail block D' which is fitted to traverse upon them and may be fastened in the desired position by the key E. The square shaft F is fitted to turn in the dial G which is fastened to the head block D, the shaft F being provided with a spring crank H by which it is turned and secured in the required position. There is a traversing stand I on each of these blocks connected to the racks I' which are provided with flanges represented in dotted lines which flanges traverse in horizontal grooves in the blocks when the racks are moved by the pinions J J on the shaft F. The pinion J in the tail block D' is fitted to traverse freely on the shaft F (which shaft is made square) and the pinion is provided with gudgeons which turn in boxes fastened to the underside of the tail block for that purpose.

The log to be sawed may be fastened to the stands I I by some dogs put through the holes in the stands for that purpose or by the hook dogs J' or both.

The floor K represented in Figs. 2 and 3 between the sills A and ways B may be made to cover the sills entirely or otherwise; on this floor the bars L L' are placed in the position represented with their ends over the sills A A to which they are fastened by the bolts *a a* which extend up through the blocks *b b* and bars *c c* and top bars L² L³ also through the bars M M which are arranged right over the sills A A and secured by nuts as represented. The bars M M are connected by the bars N N' N² so as to form a frame around the saw O, fastened to the shaft P, which is fitted to turn in boxes fastened to the bars L² and N' when it is rotated by a belt applied to the pulley Q which is fastened to the shaft P.

The saw O is turned in the direction indicated by the arrow, and is supported and steadied as it enters the log by the guides *d d* fastened into the bars N N' for that purpose. The cone of pulleys R are fastened to the shaft P and carry the belt S to operate the pulleys T and shaft T' which has the pinion *e* fastened to it to drive the gear U and shaft V which has a pinion fastened which acts on the rack W (fastened to the under side of the rail C) and traverses the rails and blocks which constitute the carriage under the saw. The shaft T' has one journal in the bar L and the other in the traversing bar X which is fitted to traverse in brackets fastened to the floor K, and is operated by the lever Y which passes through it and has its fulcrum in the bar Z fastened to the sills A, so as to vibrate the shaft T' to disengage the pinion *e* from the wheel U and stop the carriage.

The shaft V has one of its bearings in the bar L and the other in a box fastened to the floor K behind the wheel U, so arranged that the pinion, which acts upon the rack W is fastened to the end of the shaft V beyond the box and bearing.

The lever *f* vibrates on a pin in the bar N² and traverses the bar *g* which carries a small binding pulley *h* to tighten the belt *i* from the shaft P to the pulley *j* which is fastened to the wheel U to turn it and the shaft V in the opposite direction and run the carriage and log back after it has been run forward by the pinion *e* acting upon the wheel U. The bar *g* is fitted to traverse in the brackets *k k* fastened to the bars M.

The revolving self acting wedge *l* is made in the form represented, that is thin at the edge, gradually increasing in thickness toward the shaft *m* which turns in the swinging frame *n* which vibrates upon the pin *p*, which connects it to the bracket *q q* fastened to the bar M; this revolving wedge $l$ is to roll in the score cut by the saw and prevent the log from springing together, so as to close the score and bind the saw; or it may be made so heavy, or weight may be applied to the frame to press it into the score, and force it open so as to let the saw run freely. This wedge $l$ will rise and fall and adjust itself to any irregularity in the surface of the log.

The bars $r$ $r$ are fastened to the rails C C to which bars the floats or scrapers S' S' are hung so as to rise and pass over the saw dust when the carriage moves in one direction; and so as to fall and push the saw dust along before them, when the motion of the carriage is reversed; these floats may be arranged so as to push the saw dust which falls between the ways B B in either direction as desired.

In order to saw crooked timber and make the saw cut its full depth in crooked parts of the timber I make a frame which is represented in Figs. 5 and 6, and hang it to the sills A' A' (which may be arranged two feet or more below the sills A A) so that it will vibrate. This frame consists of the rails B' B' connected to the sills A' A' by the hinges $t$ $t$ upon these rails the blocks $b'$ $b'$ $c'$ $c'$, &c., are piled for the frame around the saw to rest upon which consists of the bars $u$ $u'$ $u^2$ connected by the bars $v$ $v$ which are placed upon the top of $u$ and $u^2$ and the bolts $a'$ $a'$ which pass through the bars rails and blocks hold the whole together.

The say shaft P' turns in boxes fastened to the bars $u$ and $u'$ and carries the saw O' which is supported and steadied by the guides $d'$ $d'$ when it enters the log to saw it one of which guides is fastened in the bar $u'$ and the other in the bar $u^3$ parallel to $u'$ on the opposite side of the saw. The pulley $w$ on the shaft P' carries the belt $w'$ which operates the pulley $x$ and shaft $x'$ which shaft is provided with a cone of pulleys $y$, and a pulley $z$, the former carrying the belt $S^2$ to operate the apparatus which traverses the carriage to feed the saw and the latter to run the carriage back for a new cut by means of the belt $i'$ which belt is provided with a small binding pulley arranged on the lever $f'$ which may be hung in a bracket fastened to the rail B' so as to be operated by the foot of the attendant. The belts $S^2$ and $i'$ are intended to operate the pulleys T and $j$ heretofore described.

The revolving wedge $l'$ is constructed and arranged like the revolving wedge $l$ heretofore described.

I fasten two standards C' C' to the sills A' and perforate them for the journals of the windlass $B^2$ which is provided with a ratchet wheel $D^2$ caught by the pawl $E^2$ which pawl vibrates on a pin in the part C'. There are two hand wheels F' F' fastened to the ends of this windlass to enable the attendant to turn it and raise and lower the frame and saw, as may be necessary to follow the crook in the log being sawed, by the ropes G' G' which are fastened to the rails B' B' and pass round the windlass $B^2$ and are then fastened to the weights H' H' which should be made so heavy as to nearly balance the frame so that the attendant can raise and lower the frame and saw with ease and the greatest facility. As the carriage heretofore described and represented is designed to run under this saw and frame it is omitted in this drawing.

In addition to the ropes and weights to hold up the saw and frame there may be some rollers arranged near the saw and fitted to turn loose upon the saw shaft and roll along upon the log and hold the saw and allow it to cut its full depth in the log by vibrating the frame which supports the saw and graduating it to the crooks in the log being sawed. Or instead of the rollers upon the saw shaft some rollers may be arranged to turn on studs fastened into the frame either before or behind the saw shaft or both before and behind if it should be found desirable so as to roll upon the log and support the frame in advance of the saw when the log is traversed in either direction. By this arrangement the saw can be operated to cut its full depth in crooked logs as required; besides the frame can be raised and lowered to adapt the saw to logs of different sizes with facility. And further the saw may be made to cut its full depth in the top of a log which is so large that the saw will not cut entirely through it making the score on the top of the log affording an opportunity for driving wedges so as to split what is not sawed which could not be done conveniently if the log ran over the saw as practised in the mills heretofore made.

If it should be preferred the saw may be arranged in a frame fitted to slide up and down in guides instead of being hung upon hinges as heretofore described.

I contemplate that a series of blocks $b$ $b$ (see Fig. 4) may be used instead of the bars $c$ $c$ so as to set the top frame higher or lower by loosening the bolts $a$ $a$ and taking out the blocks and putting them upon the top of the bars M M under the nuts of the bolts $a$ $a$ which may be tightened to secure the whole together; in this way the top frame may be set higher or lower to suit the size of the saw used or adapt it to the log or timber to be sawed. Also that the shaft V may be made longer between the wheel U and the pinion which traverses the carriage and that the ways B B may be set further from the wheel U so that the bar $L^3$ and the blocks which support it may be removed and put under the bars M M between the ways B B and the wheel U to support the top frame and leave the space beyond the saw entirely open and unobstructed, so as to facilitate the introduction of the logs and the removal of the lumber; also that small wheels may be used to guide the saw instead of the guides $d\,d$.

And further that when the saw is arranged in a swinging or sliding frame, that instead of the rope and windlass described racks and pinions or levers or some other convenient fixtures may be used to raise and lower the frame as desired.

The mill having been constructed and completed as above described a log is put upon the carriage and fastened as heretofore described, and the shaft F turned by the crank H to place the log as required, and the pivot of the crank inserted in one of the holes in the dial G to hold it, while the log is traversed under the saw by the motion of the carriage, the saw cutting with the grain of the wood. When the saw has cut once through the log, the operator moves the lever Y so as to throw the pinion $e$ out of gear and stop the carriage. He then moves the lever $f$ so as to tighten the belt $i$ and run the carriage back; when he moves the log by turning the crank H and inserting the pin in a new hole in the dial G, and moves the lever Y so as to traverse the carriage forward again and make another cut in the log.

When the mill is constructed with a swinging frame and the saw hung in it as above stated the operation is the same as the operation above described except that the attendant raises and lowers the frame to correspond with the crooks in the log while the saw is in operation or if it is constructed with rollers to roll along upon the log he can leave the frame and saw at liberty to adapt themselves to the crooks or curvatures of the log being sawed without further attention or assistance from the attendant. Also that the rails of the swinging frame may be hung above or on a level with the carriage if the rails are made long enough as may be most convenient or desirable.

The advantages of my improvements are as follows, viz:

1st. The saw cuts with the grain of the wood instead of against it as heretofore practised; so as to leave the lumber sawed much smoother, and at the same time the saw does a given amount of work with far less power than when it is run so as to cut against the grain of the wood.

2d. The guides are arranged so as to support and steady the saw where it enters the log to cut it and not where it escapes from the log after it has done its service as they have been used heretofore. When the guides are arranged so as to support and steady the saw where it enters the log to cut it the guides prevent the saw from being swerved by knots, cross-grained or hard places in the wood sawed, and enables it to cut much straighter and smoother than when they are arranged to support the saw where it leaves the log.

3d. The saw is surrounded by a frame and may be covered with a case so that there would be far less danger of the workmen falling upon it than when the log runs over the saw.

4th. The head and tail blocks are so constructed as to support the stuff after it is sawed, so that it may remain upon the carriage until the log is all sawed; when it may be turned down and sawed the other way so as to make joist or frame timber as desired.

5th. Floats or scrapers may be arranged so as to deliver all the saw dust at the ends of the ways nearest to the furnace or otherwise as desired.

6th. The revolving wedge follows in the score cut by the saw and adjusts itself, relieving the workman from the labor of driving wedges in the score behind the saw.

7th. This mill when made of a moderate size may be transported whole by an ordinary team, and if made large it is so constructed that it can be taken down, removed and set up again with the greatest facility.

8th. The advantages of hanging the saw in a swinging frame are, 1st it adapts the mill to sawing crooked logs into ship-plank, flitch timber, beams for ships &c. as the vibrations of the swinging frame permits the saw to cut its full depth notwithstanding the log may be crooked 2d is when the saw is too small to cut entirely through the log it will cut a score its full depth in the top of the log thereby affording facilities for splitting what remains below the cut which are not attained by mills which have been heretofore constructed.

What I claim as my invention and desire to secure by Letters Patent is—

1. A swinging frame, B', or its equivalent carrying a circular saw, O, so constructed and arranged that the saw may be made or allowed to cut its full depth in crooked as well as straight logs substantially as described.

2. The revolving selfacting wedge $l$ hung or arranged so as to vibrate and accommodate itself to any crooks curves or inequalities in the log or stuff sawed substantially as described for the purposes set forth.

3. The floats or scrapers $s'\,s'$ hinged to the carriage, or their equivalents to push the saw dust in such direction as may be desired substantially as described.

4. I am aware that guides have been used to steady circular saws where they passed out of the log after cutting the score, and also where they enter a score already cut by the saw; therefore I make no claim to guides used under such circumstances. But I believe guides have never been used prior to my invention to steady and support circular saws, where they enter and cut the log as they enter. I therefore claim a circular saw O in combination with guides $a$ $a$ so arranged as to steady and support the saw, where it enters and cuts a score in the log substantially as described, to prevent the saw from being swerved by knots, cross grained or hard places in the wood sawed.

JOHN STULL.

Witnesses:
   I. DENNIS, Jr.,
   SAML. GRUBB.